US010577132B2

(12) United States Patent
Mori et al.

(10) Patent No.: US 10,577,132 B2
(45) Date of Patent: Mar. 3, 2020

(54) TORQUE GENERATION SYSTEM, ATTITUDE CONTROL SYSTEM FOR SPACECRAFT, AND RELATIVE POSITION AND VELOCITY CONTROL SYSTEM FOR SPACECRAFT

(71) Applicant: Japan Aerospace Exploration Agency, Tokyo (JP)

(72) Inventors: Osamu Mori, Sagamihara (JP); Junichiro Kawaguchi, Sagamihara (JP); Yoji Shirasawa, Sagamihara (JP); Toshihiro Chujo, Sagamihara (JP); Kosuke Akatsuka, Sagamihara (JP)

(73) Assignee: Japan Aerospace Exploration Agency, Tokyo (JP)

( * ) Notice: Subject to any disclaimer, the term of this patent is extended or adjusted under 35 U.S.C. 154(b) by 36 days.

(21) Appl. No.: 15/993,302

(22) Filed: May 30, 2018

(65) Prior Publication Data

US 2018/0290769 A1 Oct. 11, 2018

Related U.S. Application Data

(62) Division of application No. 15/150,994, filed on May 10, 2016.

(30) Foreign Application Priority Data

May 12, 2015 (JP) .................................. 2015-097605

(51) Int. Cl.
*B64G 1/40* (2006.01)
*B64G 1/24* (2006.01)
(Continued)

(52) U.S. Cl.
CPC ............... *B64G 1/407* (2013.01); *B64G 1/10* (2013.01); *B64G 1/24* (2013.01); *B64G 1/34* (2013.01);
(Continued)

(58) Field of Classification Search
CPC . B64G 1/407; B64G 1/10; B64G 1/34; B64G 1/44; B64G 1/24; B64G 1/443;
(Continued)

(56) References Cited

U.S. PATENT DOCUMENTS 5,520,359 A * 5/1996 Merhav .................... B64G 1/44
244/172.7
6,017,001 A * 1/2000 Lambeaux ............... B64G 1/24
244/169

(Continued)

FOREIGN PATENT DOCUMENTS

JP 2000-296800 A 10/2000
JP 2015-000703 A 1/2015

OTHER PUBLICATIONS

Fellmeth et al. "20.1% Efficient Silicon Solar Cell With Aluminum Back Surface Field", 2011.*
(Continued)

*Primary Examiner* — Assres H Woldemaryam
(74) *Attorney, Agent, or Firm* — Studebaker & Brackett PC

(57) ABSTRACT

A torque generation system includes: a plurality of solar array panels and/or solar array panel divisions; and a torque controller configured to control an electricity generation ratio of each of the plurality of solar array panels and/or solar array panel divisions to generate torque.

8 Claims, 11 Drawing Sheets

(51) Int. Cl.
*H02S 40/30* (2014.01)
*B64G 1/44* (2006.01)
*B64G 1/36* (2006.01)
*B64G 1/10* (2006.01)
*B64G 1/34* (2006.01)

(52) U.S. Cl.
CPC ............. *B64G 1/361* (2013.01); *B64G 1/365* (2013.01); *B64G 1/44* (2013.01); *B64G 1/443* (2013.01); *H02S 40/30* (2014.12); *B64G 1/36* (2013.01)

(58) Field of Classification Search
CPC .......... B64G 1/365; B64G 1/361; B64G 1/36; H02S 40/30
See application file for complete search history.

(56) References Cited

U.S. PATENT DOCUMENTS

| | | | | |
|---|---|---|---|---|
| 2003/0098394 | A1* | 5/2003 | Cooper | B64G 1/24 244/166 |
| 2003/0164429 | A1* | 9/2003 | McGovern | B64G 1/285 244/171 |
| 2009/0007960 | A1* | 1/2009 | Ito | H01L 21/76254 136/255 |
| 2009/0230250 | A1* | 9/2009 | Wehner | B64G 1/283 244/172.7 |
| 2012/0303185 | A1* | 11/2012 | Munir | B64G 1/244 701/13 |
| 2014/0099746 | A1* | 4/2014 | Furihata | H01L 31/18 438/64 |
| 2015/0001345 | A1* | 1/2015 | Polle | B64G 1/26 244/158.6 |
| 2017/0269610 | A1* | 9/2017 | Weiss | B64G 1/244 |

OTHER PUBLICATIONS

Tsuda et al., Challenges and Results on Attitude Control Operation of World's First Solar Power Sail Ikaros, Journal of Space Technology and Science, 2013, pp. 69-78, vol. 27.

Akatsuka et al., 1M 03 Attitude Control of Satellite by Using Thermal Radiation Pressure, Literature of lack of novelty.

Nishida; "Recent Trends in Three-Axis Stabilized Satellites"; Journal of the Japan Society for Aeronautical and Space Sciences; Apr. 1974; pp. 200-207; vol. 22; No. 243; Japan; with English language translation.

Kosuke Akatsuka et al., "Attitude Control of Earth Orbiting Satellite by Solar Radiation Pressure", Post-printing Collection of 24th Astrodynamics Symposium, Jul. 28, 2014.

An Office Action mailed by the Japanese Patent Office dated Apr. 3, 2019, which corresponds to Japanese Patent Application No. 2015-097605 and is related to U.S. Appl. No. 15/993,302.

\* cited by examiner $\Sigma_O$ : ORBIT-FIXED FRAME
$\Sigma_B$ : BODY-FIXED FRAME

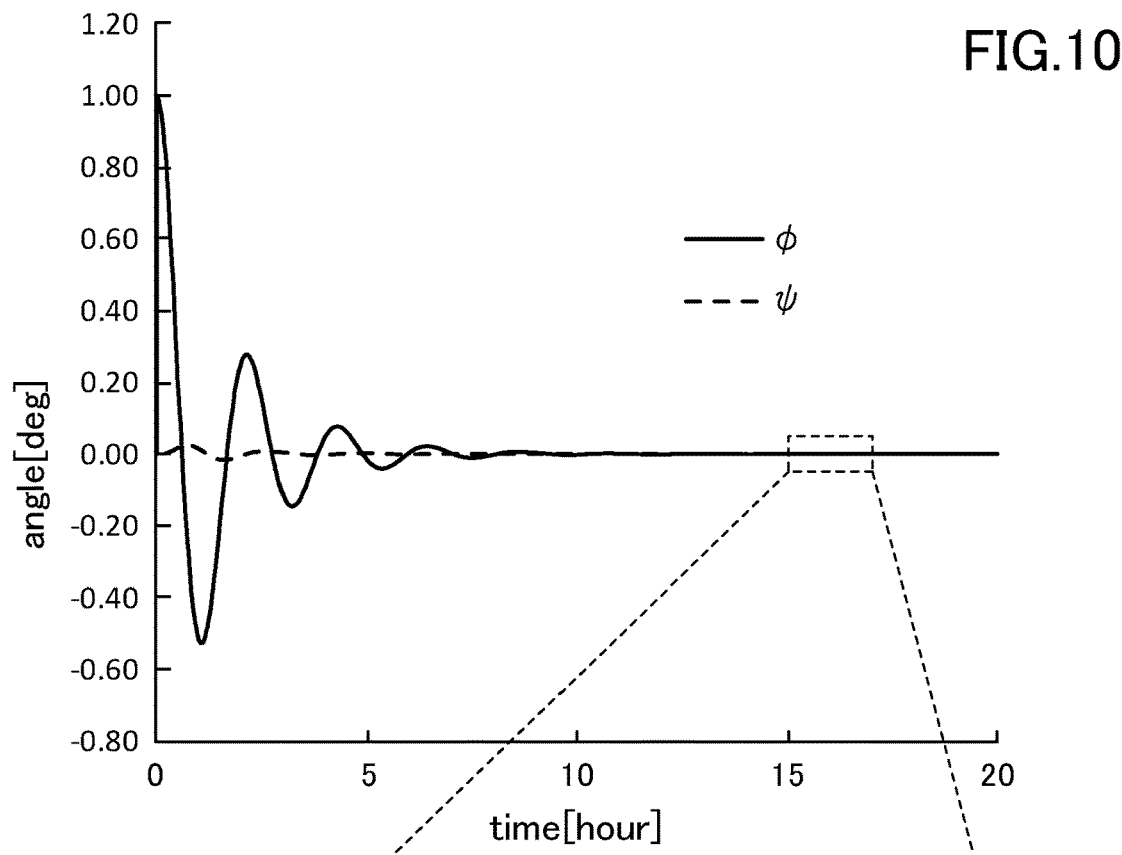
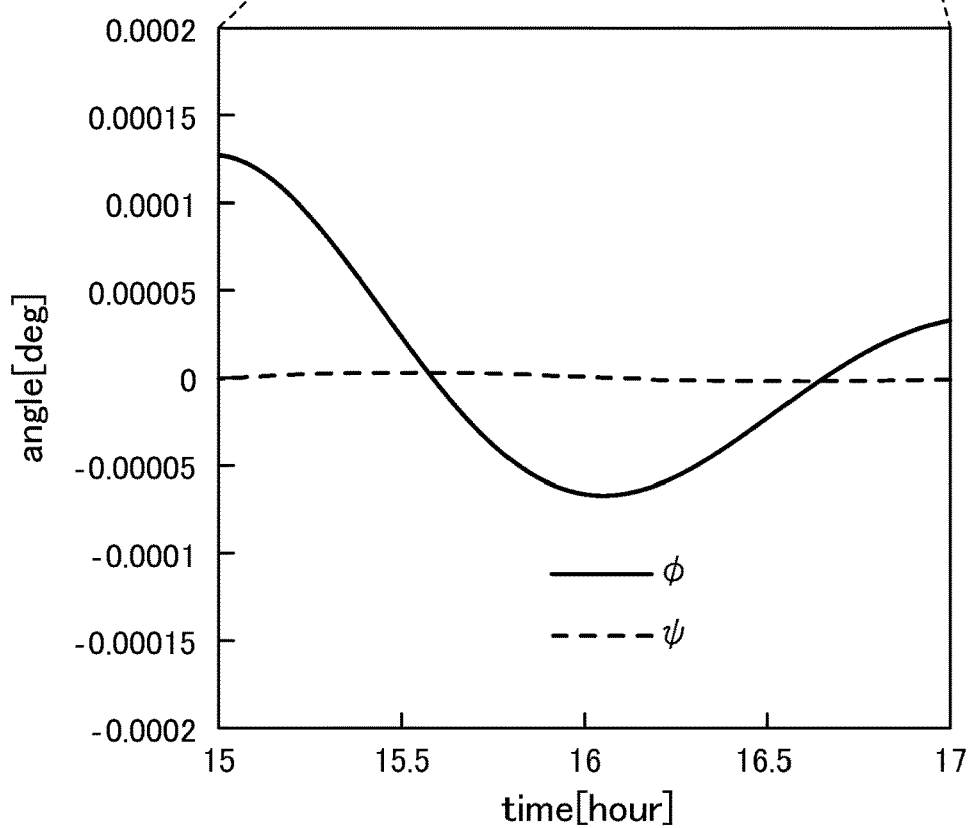
FIG.10

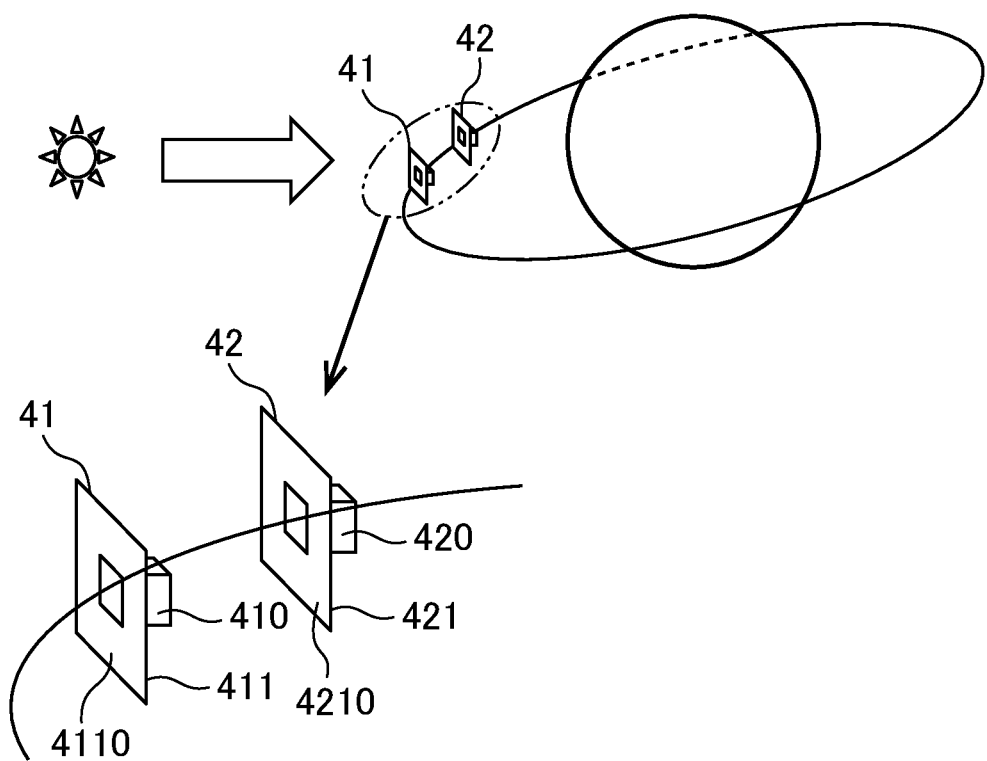

TORQUE GENERATION SYSTEM, ATTITUDE CONTROL SYSTEM FOR SPACECRAFT, AND RELATIVE POSITION AND VELOCITY CONTROL SYSTEM FOR SPACECRAFT

CROSS-REFERENCE TO RELATED APPLICATION

This application is a divisional of U.S. application Ser. No. 15/150,994 filed May 10, 2016 and claims priority to Japanese Patent Application No. 2015-097605 filed May 12, 2015, the disclosure of which is incorporated by reference herein.

BACKGROUND OF THE INVENTION

Field of the Invention

The present invention relates to torque generation systems, attitude control systems for a spacecraft, and relative position and velocity control systems for a spacecraft. The present invention more particularly relates to a torque generation system, an attitude control system for a spacecraft, and a relative position and velocity control system for a spacecraft, which use a thermal radiation pressure generated from a solar array panel.

Description of the Related Art

The attitude of spacecraft, such as satellites and space probes, is disturbed by disturbance torque. FIG. 1 is an explanatory view of various kinds of disturbance torque based on computation examples of disturbance torque with respect to the altitude of earth orbiting satellites, which is illustrated in "Recent Trends in Three-Axis Stabilized Satellites" by Susumu Nishida in the Journal of the Japan Society for Aeronautical and Space Sciences, Vol. 22, No. 243, 1974, p. 200. According to FIG. 1, aerodynamics torque is a main disturbance in the very low-altitude orbit in an altitude range of about 100 to 200 km, gravity gradient torque is the main disturbance in an orbit in an altitude range up to about 10,000 km, and radiation pressure torque is the main disturbance in a higher altitude orbit.

In formation flight of a plurality of spacecraft and the like, it is necessary to regulate the relative position and relative velocity of the spacecraft.

As means for correcting a deviated attitude of the spacecraft and/or regulating the relative position and relative velocity of the spacecraft, thrusters and reaction wheels are conventionally used (Japanese Laid-Open Patent Publication No. 2000-296800 and Japanese Laid-open Patent Publication No. 2015-703). A technology to control the attitude with a liquid crystal device that changes thrust caused by a solar radiation pressure is recently being developed (Y. Tsuda, Y. Mimasu, R. Funase, T. Saiki, Y. Shirasawa, O. Mori, N. Motooka, and T. Yamamoto, "Challenges and Results on Attitude Control Operation of World's First Solar Power Sail IKAROS," Journal of Space Technology and Science, Vol. 27, No. 1, 2013, pp. 69-78).

However, the amount of fuel mountable on a spacecraft is limited, and the thruster is not operable once the fuel is exhausted. Moreover, while the reaction wheel sufficiently suppresses the turbulence of its own making, there is a demand for an attitude control device that causes further lower turbulence for use in future earth observation and astronomical observation missions which challenge a diffraction limit in short wavelength bands, for example. For example, the Solar-B project, which is a solar observation satellite project, requires a degree of attitude stabilization of 3.0 arcsec/10 sec and 2.0 arcsec/hour and the Solar-C project requires a degree of attitude stabilization even higher than that in the Solar-B project.

A typical satellite-mounted wheel generates turbulence as illustrated in Table 1.

TABLE 1

|  |  | Magnetic bearing wheel | General wheel |
|---|---|---|---|
| Generated turbulence | High-frequency area | 0.02 [Nm] | 0.2 [Nm] |
|  | Low-frequency area | 0.001 [Nm] | 0.001 [Nm] |
|  | Large-sized satellite | 2 [arcsec/10 sec] | 20 [arcsec/10 sec] |
|  |  | 2 [arcsec/10 sec] | 2 [arcsec/10 sec] |
|  | Small to middle-sized satellite | 20 [arcsec/10 sec] | 200 [arcsec/10 sec] |
|  |  | 30 [arcsec/10 sec] | 20 [arcsec/10 sec] |

As illustrated in Table 1, the Solar-B project requires a degree of attitude stabilization which is difficult for existing wheels to achieve. The Solar-C project requires an even higher degree of attitude stabilization.

In formation flight of spacecraft and the like, it is necessary to regulate the relative position and relative velocity of the spacecraft with high precision.

Accordingly, when the aforementioned technology involving use of the liquid crystal device to change the thrust caused by a solar radiation pressure is used, it becomes possible to control the attitude of spacecraft and to control the relative position and relative velocity of the spacecraft without using a thruster. This leads to implementation of the spacecraft with a lighter weight and a longer life span. Furthermore, since the reaction wheel is not mounted on the spacecraft, the attitude control completely free from causing turbulence can be achieved. However, in order to utilize such a technology, the liquid crystal device needs to be mounted on the spacecraft as an additional component.

Accordingly, an object of the present invention is to provide a torque generator capable of generating very small torque by using a component which is also used as a component constituting a spacecraft.

Another object of the present invention is to provide an attitude control system for a spacecraft, and a relative position and velocity control system for a spacecraft with high precision and without causing turbulence, the systems being free from the necessity of mounting an additional device on the spacecraft.

SUMMARY OF THE INVENTION

One aspect of the present invention is to provide a torque generation system, including: a plurality of solar array panels and/or solar array panel divisions; and a torque controller configured to control an electricity generation ratio of each of the plurality of solar array panels and/or solar array panel divisions to generate torque.

The electricity generation ratio may be controlled by turning on, turning off, or switching a shunt switch provided for each of the plurality of solar array panels and/or solar array panel divisions.

The electricity generation ratio may be controlled by switching a maximum output state and a shunt state in each of solar cell groups whose regions are smaller than each of the plurality of solar array panels and/or solar array panel divisions.

The torque controller may put at least one of the plurality of solar array panels and/or solar array panel divisions in a shunt state.

The torque controller may put at least one of the plurality of solar array panels and/or solar array panel divisions in a maximum output state.

Each of the solar array panels may have a light receiving surface significantly higher in temperature than a surface opposite to the light receiving surface of each of the solar array panels during operation.

A member with small thermal conductivity may be arranged between the light receiving surface of each of the solar array panels and the surface opposite to the light receiving surface of each of the solar array panels.

The surface opposite to the light receiving surface may be smaller in thermal emissivity than the light receiving surface.

The surface opposite to the light receiving surface of each of the solar array panels may be coated with aluminum.

Another aspect of the present invention is to provide an attitude control system for a spacecraft, including: a plurality of solar array panels and/or solar array panel divisions; and an attitude controller configured to control an electricity generation ratio of each of the plurality of solar array panels and/or solar array panel divisions to generate torque used to control an attitude of the spacecraft.

The electricity generation ratio may be controlled by turning on, turning off, or switching a shunt switch provided for each of the plurality of solar array panels and/or solar array panel divisions.

The electricity generation ratio may be controlled by switching a maximum output state and a shunt state in each of solar cell groups whose regions are smaller than each of the plurality of solar array panels and/or solar array panel divisions.

The attitude control system may further includes: an attitude detector configured to detect the attitude of the spacecraft; and a target attitude setting unit configured to set a target attitude of the spacecraft, wherein the attitude controller may control the electricity generation ratio of each of the plurality of solar array panels and/or solar array panel divisions to generate torque that decreases a difference between a current attitude detected by the attitude detector and the target attitude.

The attitude may be an attitude angle, and the attitude controller may perform feedback control based on the attitude angle.

The target attitude may be an attitude whereby the spacecraft points to the sun.

The attitude control system may further include a disturbance torque estimation unit configured to estimate disturbance torque, wherein the attitude controller may control the electricity generation ratio of each of the plurality of solar array panels and/or solar array panel divisions to generate torque that suppresses the disturbance torque estimated by the disturbance torque estimation unit.

The plurality of solar array panels and/or solar array panel divisions may be arranged to generate torque for rotating the spacecraft around one predetermined axis.

The one predetermined axis may extend in a travelling direction of the spacecraft or in a center of the earth direction.

The plurality of solar array panels and/or solar array panel divisions may be arranged to generate torque for rotating the spacecraft around two predetermined axes, respectively.

The two predetermined axes may extend in a travelling direction of the spacecraft and in a center of the earth direction.

The plurality of solar array panels and/or solar array panel divisions may be symmetrically arranged with respect to a body of the spacecraft.

Each of the solar array panels may have a light receiving surface significantly higher in temperature than a surface opposite to the light receiving surface of each of the solar array panels during operation.

A member with small thermal conductivity may be arranged between the light receiving surface of each of the solar array panels and the surface opposite to the light receiving surface of each of the solar array panels.

The surface opposite to the light receiving surface may be smaller in thermal emissivity than the light receiving surface.

The surface opposite to the light receiving surface of each of the solar array panels may be coated with aluminum.

Another aspect of the present invention is to provide a spacecraft including the attitude control system.

Still another aspect of the present invention is to provide a system for controlling a relative position and/or a relative velocity of a first spacecraft and a second spacecraft, including: the first spacecraft and the second spacecraft each including a solar array panel; and a relative position and velocity controller configured to control an electricity generation ratio of each of the solar array panels of the first spacecraft and the second spacecraft to cause each of the first spacecraft and the second spacecraft to generate thrust that changes the relative position and/or velocity of the first spacecraft and the second spacecraft.

The system may further include a relative position and velocity setting unit configured to set a target relative position and/or a target relative velocity of the second spacecraft relative to the first spacecraft, wherein the relative position and velocity controller may control the electricity generation ratio of each of the solar array panels of the first spacecraft and the second spacecraft to cause each of the first spacecraft and the second spacecraft to generate thrust that provides the target relative position and/or target relative velocity set by the relative position and velocity setting unit.

The first spacecraft and the second spacecraft each may include a position detector configured to detect a position of its own spacecraft and to output position information, the system may further includes a relative position and velocity calculation unit configured to calculate the relative position and/or relative velocity of the second spacecraft relative to the first spacecraft based on the position information from the position detectors of the first spacecraft and the second spacecraft, and the relative position and velocity controller may control the electricity generation ratio of each of the solar array panels of the first spacecraft and the second spacecraft based on the relative position and/or relative velocity of the second spacecraft relative to the first spacecraft calculated by the position and velocity calculation unit.

The relative position and velocity controller may put the solar array panel of the second spacecraft in a shunt state.

The relative position and velocity controller may put the solar array panel of the first spacecraft in a maximum output state.

Each of the solar array panels may have a light receiving surface significantly higher in temperature than a surface opposite to the light receiving surface of each of the solar array panels during operation.

A member with small thermal conductivity may be arranged between the light receiving surface of each of the solar array panels and the surface opposite to the light receiving surface of each of the solar array panels.

The surface opposite to the light receiving surface may be smaller in thermal emissivity than the light receiving surface.

The surface opposite to the light receiving surface of each of the solar array panels may be coated with aluminum.

An attitude of the first spacecraft and/or the second spacecraft may be controlled to cause the solar array panels of the first spacecraft and/or the solar array panels of the second spacecraft to point to the sun.

In the specification and claims of the present invention, a term "electricity generation ratio" refers to a ratio of output electricity of solar cell or cells to incoming solar energy W.

In the specification and claims of the present invention, a term "solar array panel" refers to an electricity generator including a plurality of solar cells arrayed on at least part of the surface of a support. The solar cells may be any appropriate solar cells, such as crystalline solar cells, amorphous solar cells, and thin-film solar cells. The support may have rigidity or may have flexibility. The plurality of solar cells may be arrayed on almost the entire surface of the support, or may be arrayed in one or more subregions on the surface of the support as disclosed in, for example, "Challenges and Results on Attitude Control Operation of World's First Solar Power Sail IKAROS."

The torque generator according to the present invention can generate very small torque by using solar array panels that are also used as components constituting a spacecraft.

The attitude control system for a spacecraft and the relative position and velocity control system for a spacecraft according to the present invention can control the attitude of the spacecraft and control the relative position and velocity of the spacecraft with high precision and without causing turbulence, the attitude and the relative position and velocity being controlled by using the solar array panels mounted on the spacecraft without the necessity of mounting an additional device thereon.

BRIEF DESCRIPTION OF THE DRAWINGS

FIG. 10 illustrates a result of simulation of the attitude control system for a satellite according to the first embodiment of the present invention;

FIG. 12 illustrates external appearance and arrangement of a first satellite and a second satellite according to a second embodiment of the present invention.

DETAILED DESCRIPTION OF THE PREFERRED EMBODIMENTS

Hereinbelow, some of the exemplary embodiments of the present invention will be described with reference to the accompanying drawings.

(Principle of Torque Generation System)

Figure 1:
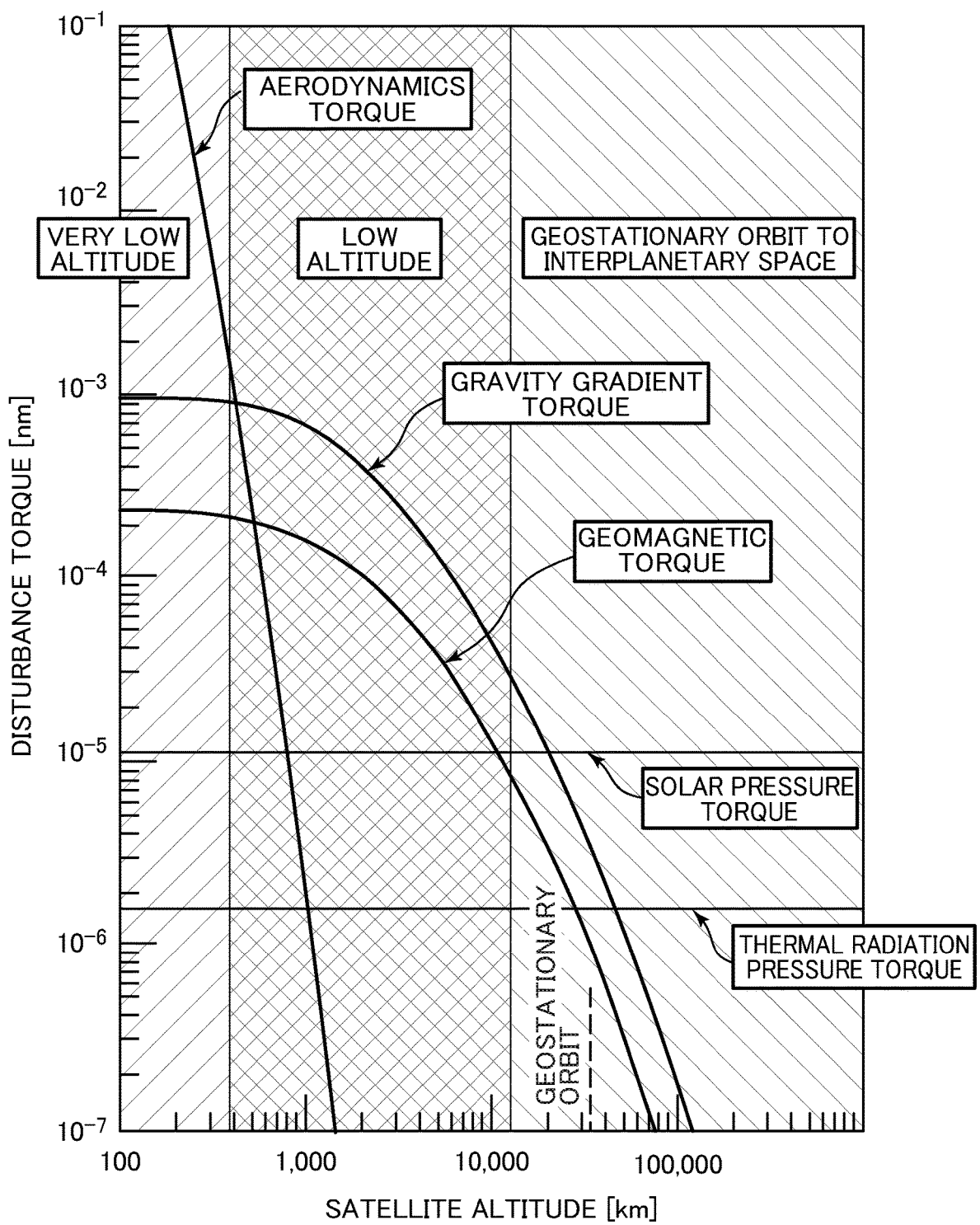
FIG. 1 is an explanatory view of various kinds of disturbance torque with respect to the altitude of earth orbiting satellites.
Figure 2:
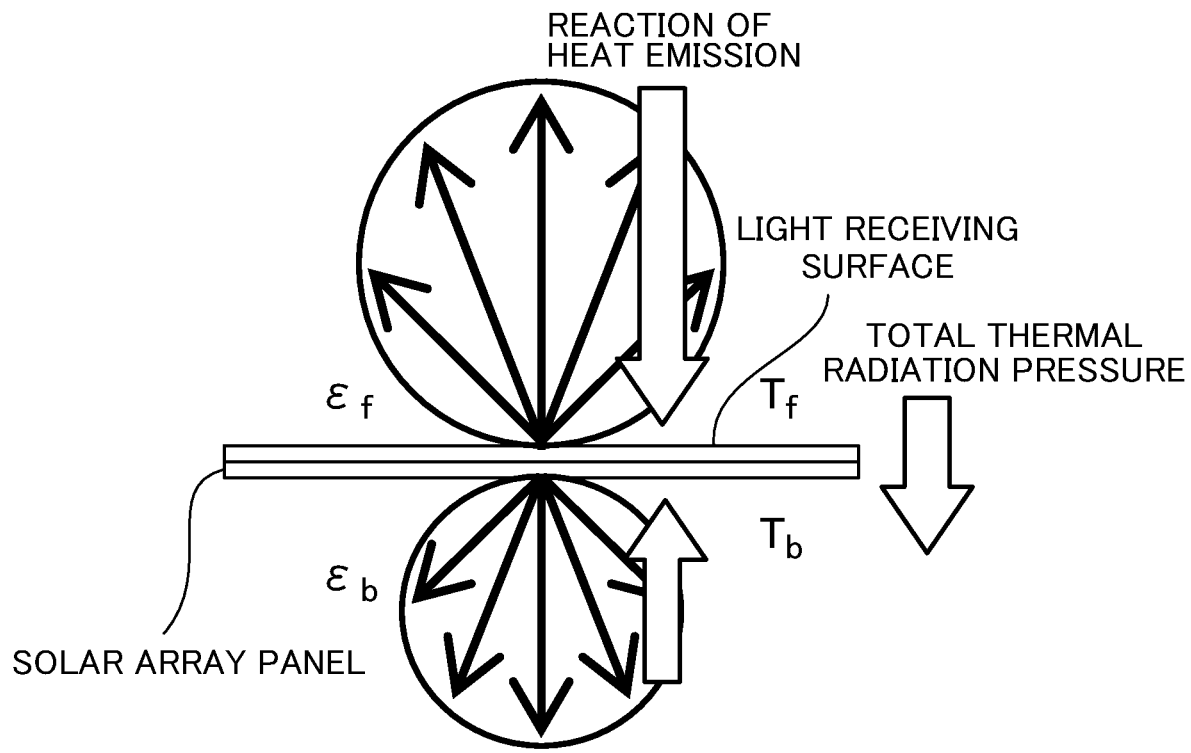
FIG. 2 illustrates the principle of generation of a thermal radiation pressure.

First, the principle of a torque generation system using solar array panels of the present invention will be described with reference to FIGS. 2 and 3.

In a distance between the sun and the earth (1AU), solar energy flux per unit area is 1370 W.

$$W = 1370 \ [W/m^2] \tag{1}$$

The solar array panels absorb the solar energy by the amount corresponding to an absorption ratio $C_{abs}$ of the solar array panels.

$$W_{in} = W \cdot C_{abs} \ [W/m^2] \tag{2}$$

Suppose that γ percent of the absorbed energy is converted into electricity.

$$W_{electric} = W_{in} \cdot \gamma = W \cdot C_{abs} \cdot \gamma \ [W/m^2] \tag{3}$$

That is, the solar array panels have an electricity generation ratio expressed as $C_{abs} \times \gamma$. A portion of the absorbed energy, which is not converted into electricity, becomes thermal energy. Although some of the thermal energy is consumed for increasing the temperature of the bodies of the solar array panels, most of the thermal energy is emitted to the outside from the surfaces of the solar array panels as thermal radiation. The amounts of energy $W_{out}^{front}$ and $W_{out}^{back}$ radiated from the light receiving surface of the solar array panel and from the surface opposite to the light receiving surface are expressed based on the Stefan-Boltzmann law as described below:

$$W_{out}^{front} = \varepsilon_f \cdot \sigma \cdot T_f^4 \ [W/m^2] \tag{4}$$

$$W_{out}^{back} = \varepsilon_b \cdot \sigma \cdot T_b^4 \ [W/m^2] \tag{5}$$

where σ is a Stefan-Boltzmann constant, and εf and εb are thermal emissivities from the light receiving surface and from the surface opposite to the light receiving surface, respectively. Based on the relationship between material characteristics of the solar array panels and conservation of energy, temperatures of the light receiving surface of the solar array panel and the surface opposite to the light receiving surface are calculated, respectively. Pressures acting as reactions of thermal energy emission from the light receiving surface and from the surface opposite to the light receiving surface are each given as below:

$$f^{front} = B_f \cdot \varepsilon_f \cdot \frac{\sigma \cdot T_f^4}{c} \ [N/m^2] \tag{6}$$

$$f^{back} = B_b \cdot \varepsilon_b \cdot \frac{\sigma \cdot T_b^4}{c} \ [N/m^2] \tag{7}$$

Therefore, a difference between the pressures acts on the solar array panels as a following thermal radiation pressure in a direction of a normal to the light receiving surface, and a direction from the light receiving surface of the solar array panel to the surface opposite to the light receiving surface:

$$f_{TRP} = \frac{\sigma}{c}(B_f \cdot \varepsilon_f \cdot T_f^4 - B_b \cdot \varepsilon_b \cdot T_b^4) \ [N/m^2] \tag{8}$$

where c is a velocity of light, $B_f$ and $B_b$ are Lambertian coefficients of the light receiving surface and the surface opposite to the light receiving surface, respectively.

Such a mechanism makes it possible to generate thrust with use of the thermal radiation pressures from the solar array panels.

According to Expression (8), it can be considered that the thermal radiation pressure in a direction from the light receiving surface of the solar array panel toward the surface opposite to the light receiving surface at a right angle with respect to the light receiving surface may be increased by (i) increasing the temperature of the light receiving surface during operation since the thermal radiation pressure is proportional to the 4th power of temperature, (ii) increasing a temperature difference between the light receiving surface and the surface opposite to the light receiving surface, and (iii) providing a large difference in thermal emissivity e between the light receiving surface and the surface opposite to the light receiving surface.

In the solar array panels mounted on existing satellites, the light receiving surface and the surface opposite to the light receiving surface are made of materials with a high thermal emissivity in order to implement active emission of heat from their surfaces. For example, the light receiving surface of the solar array panels has a thermal emissivity $\varepsilon_f$ of 0.8, while the surface opposite to the light receiving surface is made of carbon fiber reinforced plastics (CFRP) having a thermal emissivity $\varepsilon_b$ of 0.8. An aluminum honeycomb with high heat conductivity is provided between the light receiving surface and the surface opposite to the light receiving surface. Since the aluminum honeycomb is thick to some extent, a temperature $T_f$ of the light receiving surface is higher than a temperature $T_b$ of the surface opposite to the light receiving surface during operation of the solar array panels.

Suppose that conversion efficiency of the solar cells (a ratio of maximum output of the solar cells to incoming solar energy W) is 30%, according to the solar cells currently used. According to Expressions (1) to (5), the temperature of the light receiving surface of the solar array panels is $T_{maxpower} \approx 300$ K when the solar array panel is in a maximum output state and $T_{shunt} \approx 336$ K when the solar array panel is in a shunt state (where the output from the solar array panel is zero), which provides a temperature difference of about 36 K (assuming that a solar angle β=10).

Furthermore, the temperature $T_f$ of the light receiving surface is higher than the temperature $T_b$ of the surface opposite to the light receiving surface as described before. According to Expression (7), when the temperature difference is set to 10 K, the thermal radiation pressures $f_{maxpower}$ and $f_{shunt}$ applied from the front side to the back side are $8.18 \times 10^{-7}$ N/m² and $1.29 \times 10^{-6}$ N/m² in the maximum output state and in the shunt state, respectively. Consequently, a difference in thermal radiation pressure of $f_{TRP} = 4.82 \times 10^{-8}$ N/m² is generated between the solar array panel in the maximum output state and the solar array panel in the shunt state. Hereinafter, the solar array panels having such a configuration are referred to as "solar array panels having configuration 1."

In order to increase the thermal radiation pressure, it is considered to decrease the thermal emissivity e of the surface opposite to the light receiving surface in consideration of (i) and (iii) described before. For simplification, the solar array panels are made to have a sufficiently small thickness and a material with large thermal conductivity is used, so that the light receiving surface and the surface opposite to the light receiving surface have the same temperature and their time constants for temperature changes are made sufficiently small. The solar array panels are made to have an absorption ratio $C_{abs}$ of 0.8, and their light receiving surfaces have a thermal emissivity $\varepsilon_f$ of 0.8. Meanwhile, aluminum vapor deposition (thermal emissivity $\varepsilon_b$=0.05) is applied to the surface opposite to the light receiving surface, so that heat emission from the surface opposite to the light receiving surface is suppressed to increase the temperature of the solar array panels and to thereby increase the thermal radiation pressure.

When the conversion efficiency of the solar cells is set to 30% as in the case of the solar array panels having configuration 1, the temperature of the front side of the solar array panels is $T_{maxpower} \approx 340$ K in the maximum output state and $T_{shunt} \approx 383$ K in the shunt state according to Expressions (1) to (5), so that a temperature difference of about 40 K is generated (assuming that the solar angle β=10).

Furthermore, according to Expression (7), the thermal radiation pressures $f_{maxpower}$ and $f_{shunt}$ in the maximum output state and in the shunt state are $1.174 \times 10^{-6}$ N/m² and $1.879 \times 10^{-6}$ N/m², respectively. Consequently, a difference in thermal radiation pressure of $f_{TRP} = 7.05 \times 10^{-7}$ N/m² is generated between the solar array panel in the maximum output state and the solar array panel in the shunt state.

Consequently, according to such a configuration, a larger thermal radiation pressure can be generated. Hereinafter, the solar array panels having such a configuration are referred to as "solar array panels having configuration 2."

Alternatively or additionally, a material with small thermal conductivity may be used for the member placed between the light receiving surface and the surface opposite to the light receiving surface or the solar array panels may be made to have a larger thickness, for example. As a result, a temperature difference between the light receiving surface and the surface opposite to the light receiving surface becomes larger, so that a larger thermal radiation pressure can be generated.

Figure 3:
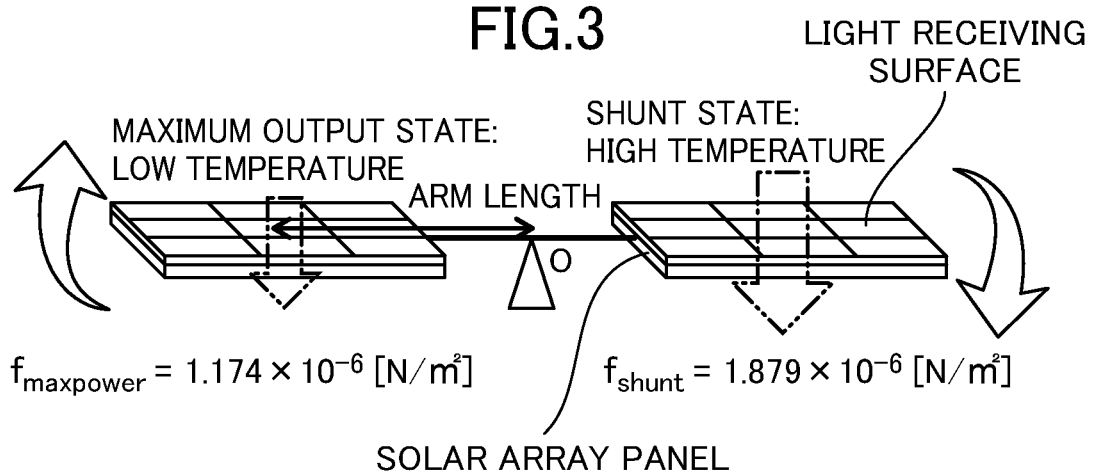
FIG. 3 illustrates the principle of generation of thermal radiation torque.

When two solar array panels are symmetrically arranged with respect to the center of rotation O and one solar array panel is put in the maximum output state while the other is in the shunt state as illustrated in FIG. 3 by using the thermal radiation pressure generated as described before, it becomes possible to generate thermal radiation torque which is a product of a difference $f_{TRP}$ between thermal radiation pressures, a surface area of the light receiving surface of the solar array panel, and an arm length from the center of rotation O to the center of pressure of the solar array panel.

First Embodiment

Figure 4:
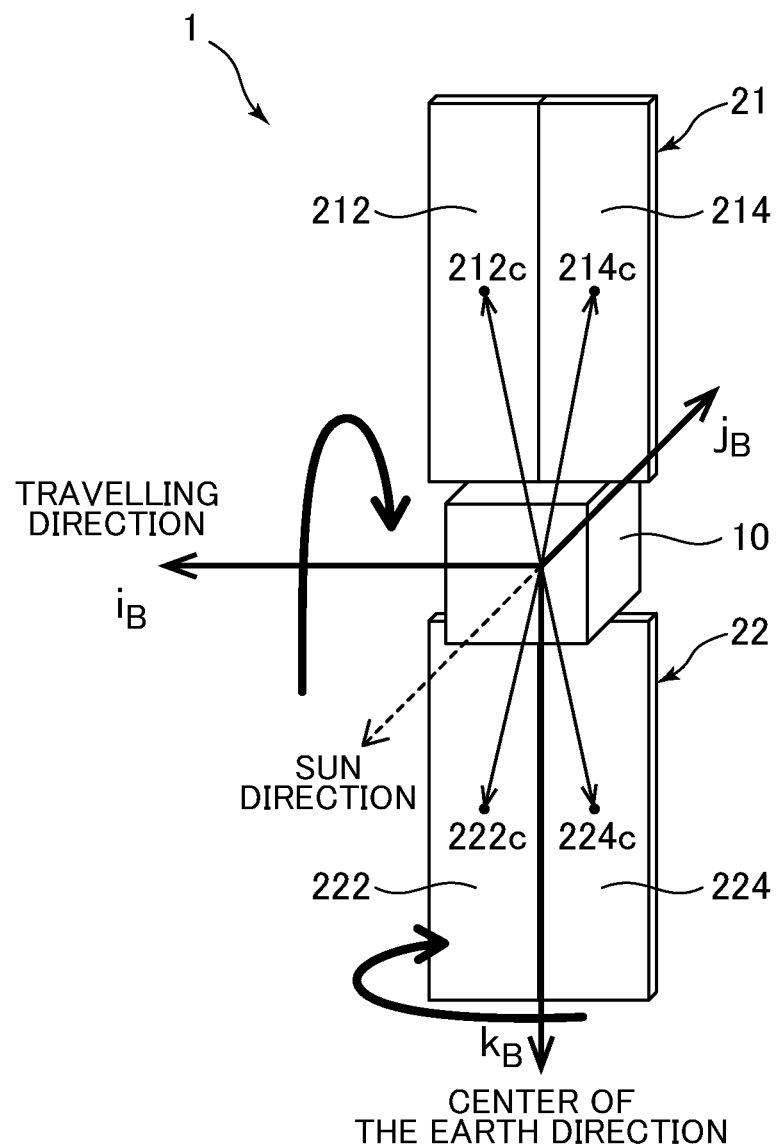
FIG. 4 is an external view of a satellite according to a first embodiment of the present invention.

FIG. 4 is an external view of a satellite 1 as a spacecraft according to a first embodiment of the present invention. The satellite 1 is a 2t-class satellite, which includes a satellite body 10 and two solar array panels 21 and 22. The satellite body 10 has a cubic shape with one side being 2 m and the center of the cube being the center of mass. The solar array panels 21 and 22 have rectangular light receiving surfaces 210 and 220 with a shorter side being 3 m and a longer side being 10 m. The solar array panels 21 and 22 have the aforementioned configuration 2 with aluminum being vapor-deposited on the surface opposite to the light receiving surface. The solar array panels 21 and 22 are completely axially symmetrically arranged for coordinate axes of a later-described body-fixed frame, with respect to the center of mass of the satellite body 10. The solar array panels 21 and 22 include solar cell arrays 212, 214, 222, and 224 which are divisions of the solar array panels. The solar cell arrays each have a longer side parallel to the longer side of the light receiving surface 210 of the solar array panel 21, and their light receiving surfaces are equal in area.

Suppose that the pressure applied to each of the solar cell arrays 212, 214, 222, and 224 concentrates on a central one point (center of pressure) of each of the solar cell arrays 212, 214, 222, and 224. A straight line connecting the centers of pressure of the solar cell arrays 212 and 224 and a straight line connecting the centers of pressure of the solar cell arrays 214 and 222 each pass through the center of mass. Therefore, in the satellite 1 according to the first embodiment, the solar array panels 21 and 22 mutually negate influence of a solar radiation pressure, which makes it possible to disregard the influence of disturbance by the solar radiation pressure torque.

Since it is possible to individually change the electricity generation ratios of the solar cell arrays 212, 214, 222, and 224 with use of the attitude controller 35 as described later, the attitude of the satellite 1 can be controlled with respect to two axes around a travelling direction and a center of the earth direction.

Table 2 indicates moment of inertia of the satellite 1.

TABLE 2

| Ix [kgm$^2$] | 15000 |
|---|---|
| Iy [kgm$^2$] | 17000 |
| Iz [kgm$^2$] | 5000 |

Table 3 indicates gravity gradient torque with respect to the altitude acting on the satellite 1.

TABLE 3

| Altitude [km] | Gravity gradient torque [Nm] |
|---|---|
| 10 | $4.78 \times 10^{-3}$ |
| 100 | $4.58 \times 10^{-3}$ |
| 200 | $4.38 \times 10^{-3}$ |
| 500 | $3.83 \times 10^{-3}$ |
| 800 | $3.37 \times 10^{-3}$ |
| 1000 | $3.10 \times 10^{-3}$ |
| 10000 | $2.84 \times 10^{-4}$ |
| 35786 Geostationary orbit | $1.66 \times 10^{-5}$ |

Figure 5:
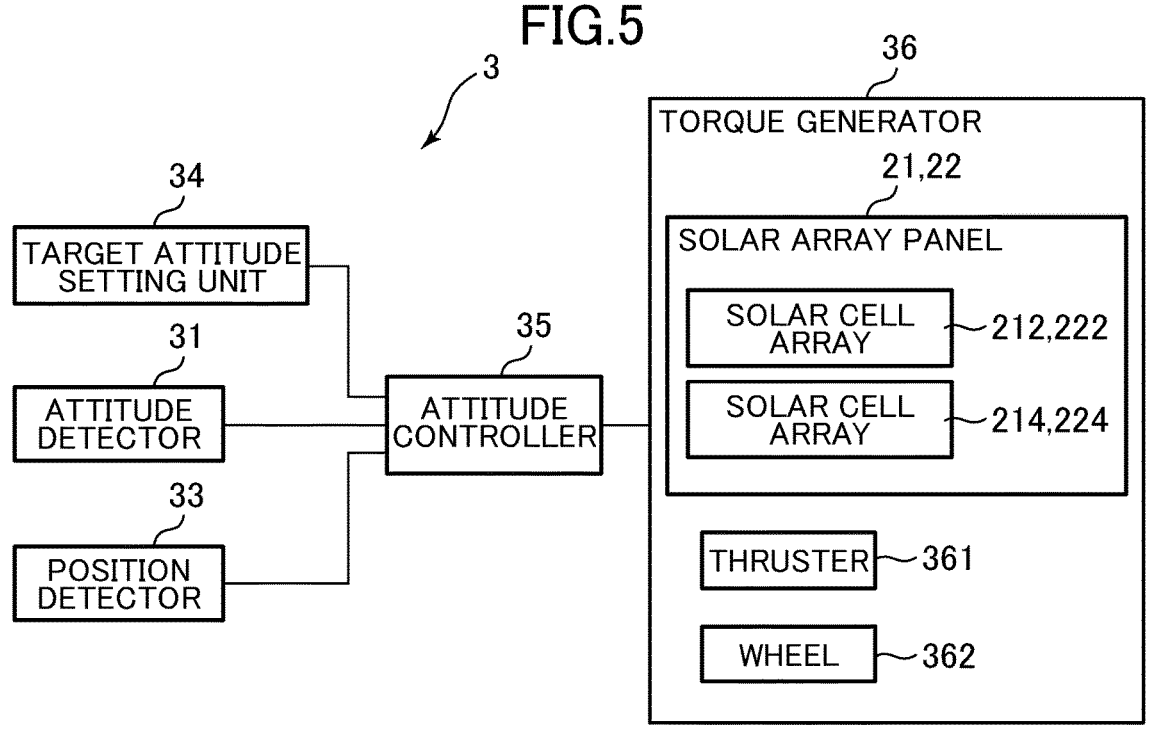
FIG. 5 illustrates the configuration of an attitude control system for a satellite according to the first embodiment of the present invention.
Figure 6:
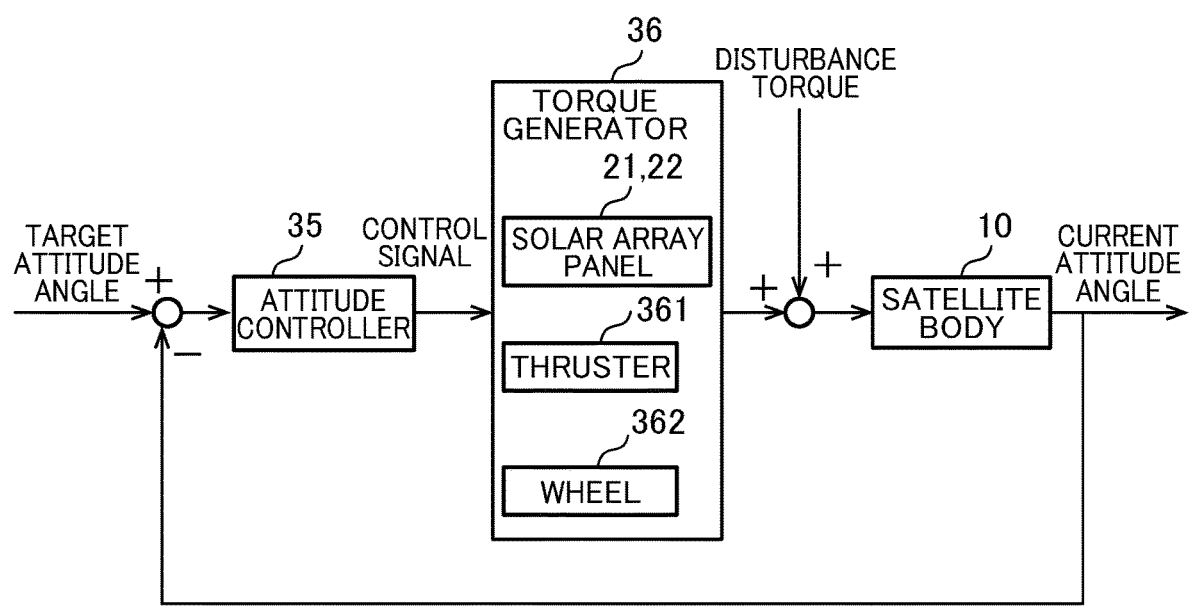
FIG. 6 is a block diagram of the attitude control system for a satellite according to the first embodiment of the present invention.

FIG. 5 illustrates the configuration of an attitude control system 3 of the satellite 1. FIG. 6 is a block diagram of the attitude control system 3 of the satellite 1.

An attitude detector 31 includes a star sensor and an earth sensor to detect an attitude angle of the satellite body 10. A position detector 33 includes a GPS positioning device to detect a position of the satellite 1 itself. The detected attitude angle is input into the attitude controller 35 from the attitude detector 31. The detected position of the satellite 1 itself is input into the attitude controller 35 from the position detector 33. The attitude detected by the attitude controller 35 may be an appropriate parameter other than the attitude angle.

A torque generator 36 includes a thruster 361, a wheel 362, and the solar array panels 21 and 22.

A target attitude setting unit 34 sets a target attitude angle that is a target attitude. As a target attitude, an appropriate parameter other than the target attitude angle may be used.

The target attitude to be set is typically an attitude of the solar array panels 21 and 22 which points to the sun for a later-described reason. However, the target attitude is not limited thereto.

Depending on the torque desired to be generated, the attitude controller 35 gives an attitude change amount as a controlled variable to one unit selected out of the thruster 361, the wheel 362, and the solar array panels 21 and 22 included in the torque generator 36. With the given attitude change amount, the attitude of the satellite 1 is controlled. The attitude controller 35 may simultaneously control a plurality of units selected out of the thruster 361, the wheel 362, and the solar array panels 21 and 22 included in the torque generator 36.

The solar cell arrays 212, 214, 222, and 224 each include a shunt switch to cause short-circuit as necessary. The attitude controller 35 can individually command turning on, turning off, and switching (repetition of turning on/off) of each shunt switch so as to continuously change the electricity generation ratio of each of the solar cell arrays 212, 214, 222, and 224 in the range of 0 to 30%.

The attitude controller 35 gives an attitude change amount to the torque generator 36 as a controlled variable based on an attitude angle from the attitude detector 31 and a target attitude angle from the target attitude setting unit 34. As a consequence, the attitude of the satellite 1 is controlled.

The attitude controller 35 may be provided in a terrestrial station to control the attitude of the satellite 1 through communication between the terrestrial station and the satellite 1. The attitude controller 35 may also be provided in another spacecraft which is not illustrated.

Figure 7:
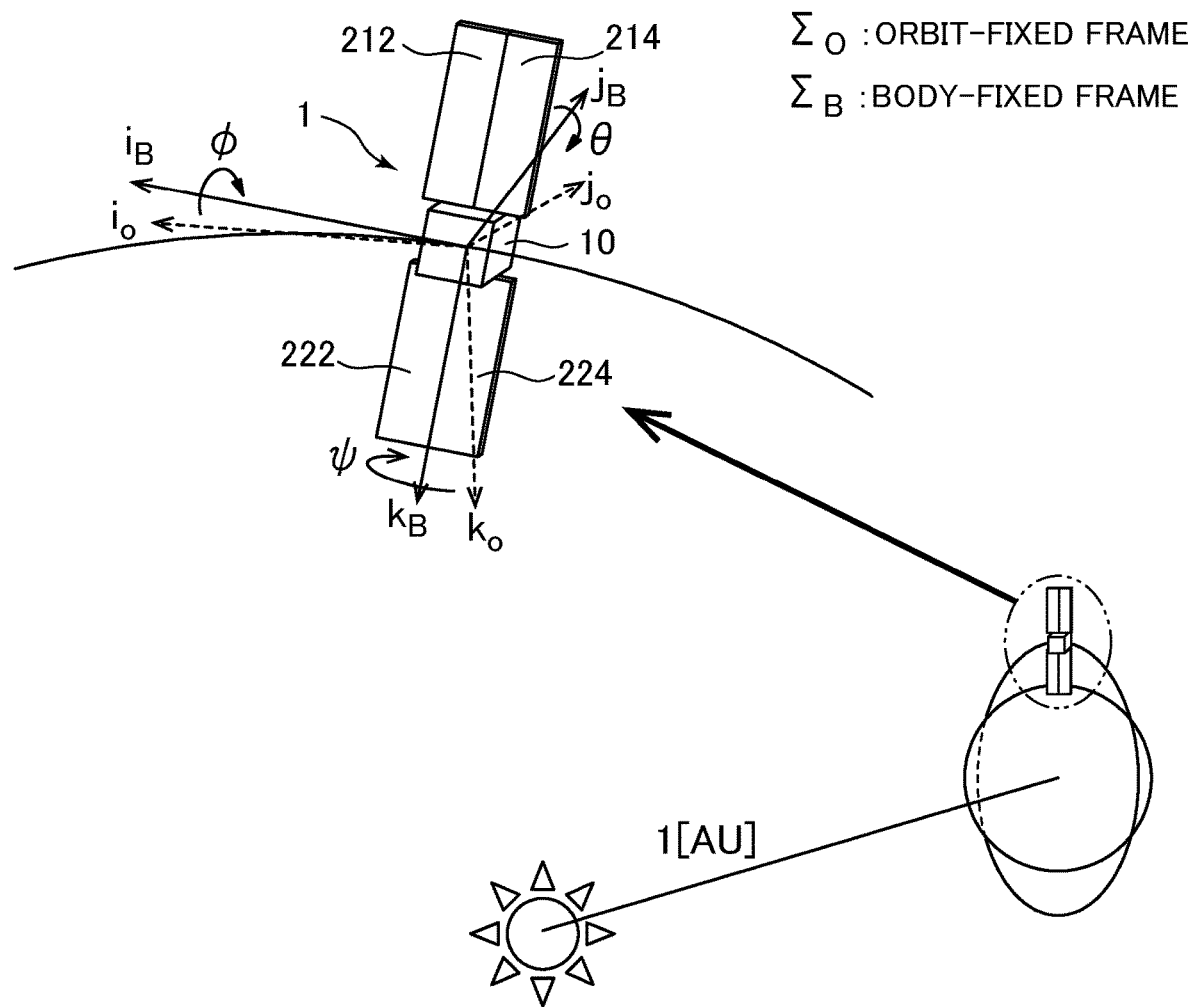
FIG. 7 illustrates the relationship between a satellite and a coordinate system according to the first embodiment of the present invention.

FIG. 7 illustrates the relationship between a satellite orbiting a celestial object and a coordinate system.

Based on the aforementioned theoretical computation of the thermal radiation pressure, the satellite 1 according to the present embodiment can generate thermal radiation torque whose maximum value is about $1.27 \times 10^{-4}$ N·m around an $i_B$ axis of the later-described body-fixed frame and about $3.17 \times 10^{-5}$ N·m around a $k_B$ axis. These values represent microscopic power between that approximately equal to and 1/100 of the values of the gravity gradient torque of Table 3. Accordingly, typical application examples of the attitude control using thermal radiation torque include but are not limited to the case of damping oscillation of the satellite 1 which is caused by disturbance applied to the satellite 1 in the gravity stable state. In this case, the longer side of the solar array panel needs to extend in the center of the earth direction. Since the thermal radiation torque is generated by short-circuiting the solar array panel, the satellite 1 needs a margin of electricity. Therefore, without being limited thereto, the most desirable orbit of the satellite is a sun-synchronous orbit in which the solar array panels point to the sun and the satellite is always exposed to the sun. FIG. 7 illustrates an example of the orbit of the satellite 1 in consideration of the above conditions.

As illustrated in FIG. 7, an orbit-fixed frame and a body-fixed frame are introduced. The orbit-fixed frame $i_O j_O k_O$ has an origin at the center of mass of the entire satellite 1. The orbit-fixed frame $i_O j_O k_O$ includes an $i_O$ axis in an orbiting direction, an $-j_O$ axis in the sun direction, and a $k_O$ axis in the center of the earth direction. The body-fixed frame $i_B j_B k_B$ is fixed to the satellite body 10. Like the orbit-fixed frame $i_O j_O k_O$, the body-fixed frame $i_B j_B k_B$ has an origin at the center of mass of the entire satellite 1. When the satellite 1 is in an ideal attitude state, the body-fixed frame matches the orbit-fixed frame. That is, the attitude angle of the satellite 1 is a parameter representing a difference in direction between the orbit-fixed frame and the body-fixed frame. To express deviation of the body-fixed frame from the orbit-fixed frame, 2-1-3 Euler angle transformation is used. A rotation angle around the travelling direction is $\varphi$, a rotation angle around the solar direction is $\theta$, and a rotation angle around the center of the earth direction is $\psi$.

The attitude controller 35 can individually control each of the electricity generation ratios of the solar cell arrays 212, 214, 222, and 224 as described before. Therefore, according to the aforementioned theory of operation of the torque generation system, it becomes possible to control the attitude of the satellite 1 around the $i_O$ axis in the travelling direction by controlling each of the electricity generation ratios of an entire group of the solar cell arrays 212 and 214 and an entire group of the solar cell arrays 222 and 224. Moreover, it becomes possible to control the attitude of the satellite 1 around the $k_O$ axis in the center of the earth direction by controlling each of the electricity generation ratios of an entire group of the solar cell arrays 212 and 222 and an entire group of the solar cell arrays 214 and 224.

Therefore, the attitude controller 35 can control the attitude of the satellite 1 around two axes including the $i_O$ axis in the travelling direction and the $k_O$ axis in the center of the earth direction.

A description is now given of the operation of the attitude control system of the present embodiment with reference to FIGS. 5 to 7.

A current attitude angle is detected by the attitude detector 31 provided in the satellite body 10. A target attitude angle is set by the target attitude setting unit 34. The current attitude angle output from the attitude detector 31 is fed back to calculate an error between the current attitude angle and the target attitude angle output from the target attitude setting unit 34. To reduce the error, the attitude controller 35 performs attitude control calculation, such as proportional-derivative (PD) control. Based on the result of the attitude control calculation, one unit selected out of the thruster 361, the wheel 362, and the solar array panels 21 and 22 included in the torque generator 36 is operated to perform attitude control. Selection of the thruster 361, the wheel 362, and the solar array panels 21 and 22 may be determined based on the value of the controlled variable and the like. When the solar array panels 21 and 22 are selected as a control object of the attitude controller 35, the attitude controller 35 controls opening and closing of each of the shunt switches of the solar cell arrays 212, 214, 222, and 224 based on the result of attitude control calculation so as to control the electricity generation ratios of the respective arrays.

Although feedback control is performed based on the attitude angle from the attitude detector 31 in the above embodiment, an attitude angular velocity detector may further be provided to perform feedback control based on an attitude angle and an attitude angular velocity.

In the above embodiment, the attitude controller 35 performs feedback control. However, alternatively or additionally, the feedback control, feedforward control may be performed. For example, a disturbance torque estimation unit for estimating disturbance torque may be provided, and an electricity generation ratio of the solar array panels and/or the solar array panel divisions may be controlled to generate torque that suppresses the disturbance torque estimated by the disturbance torque estimation unit.

A description is now given of a simulation performed for the aforementioned attitude control of the satellite 1.

Figure 8:
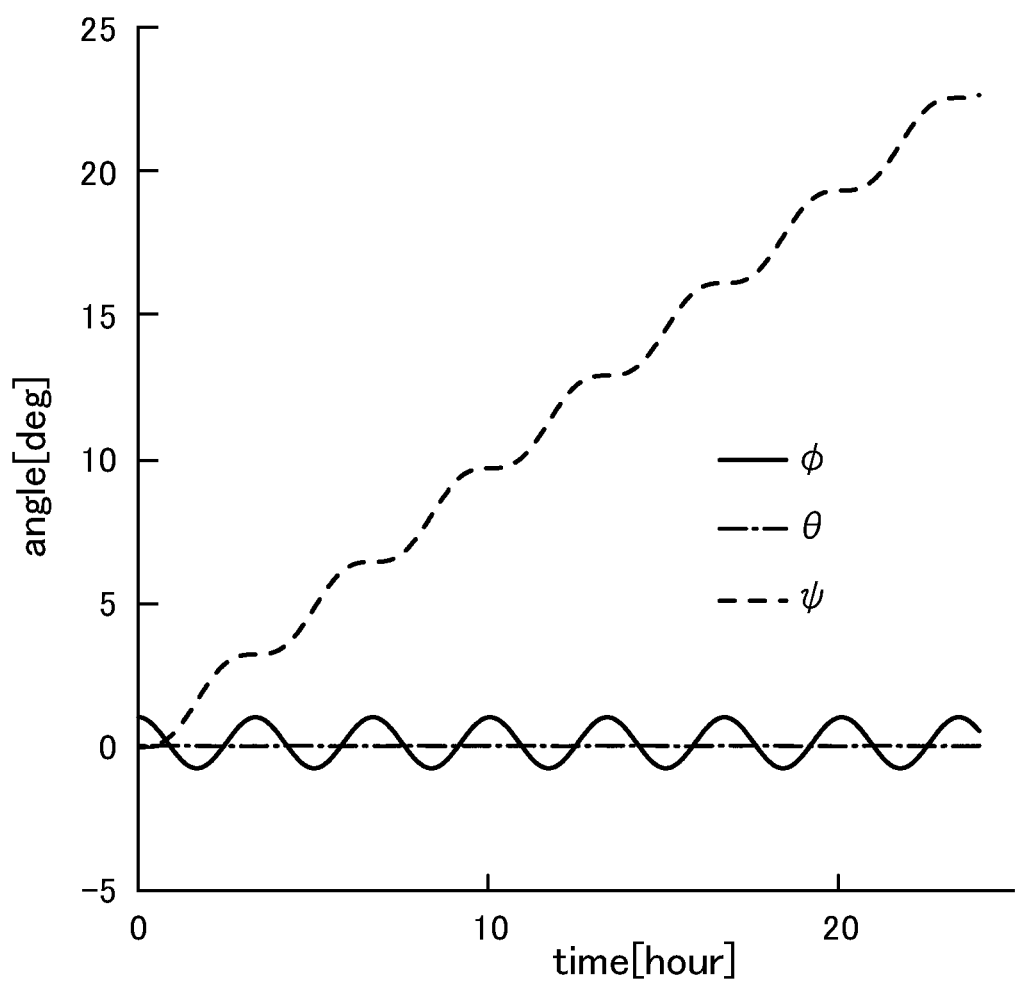
FIG. 8 illustrates a result of simulation of a change in the angle of a satellite 1 in a gravity gradient stable state.

Assume the case where the satellite 1 orbits at an altitude of 10,000 km, with initial displacement being $\varphi=1.0$ degree, $\theta=0.0$ degree, and $\psi=0.0$ degree. Changes in angles $\varphi$, $\theta$, and $\psi$ of the satellite 1 in the gravity gradient stable state in this case are illustrated in FIG. 8. As is clear from FIG. 8, the satellite 1 oscillates in the gravity gradient stable state, and this oscillation never be damped.

Accordingly, the electricity generation ratios of the solar cell arrays 212, 214, 222, and 224 are each controlled to damp the oscillation with the thermal radiation pressure.

Figure 9A:
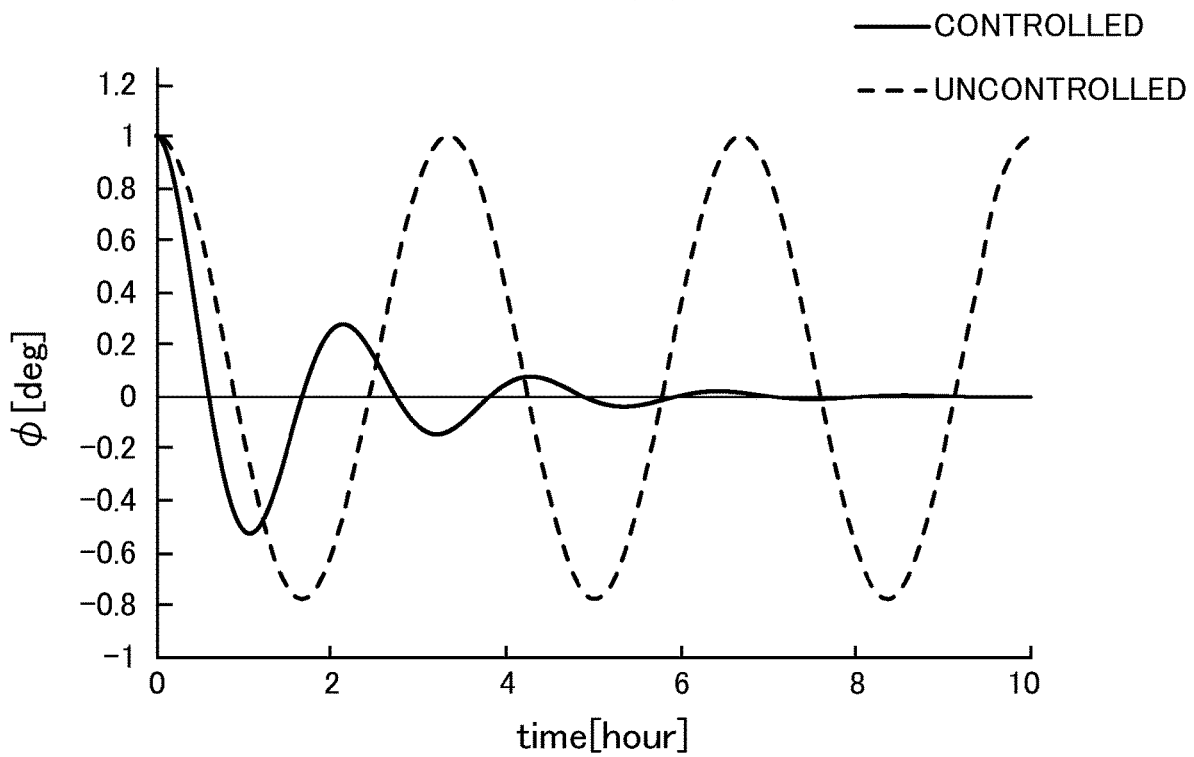
FIGS. 9(*a*) and 9(*b*) illustrate results of simulation of an attitude control system for a satellite according to the first embodiment of the present invention.
Figure 9B:
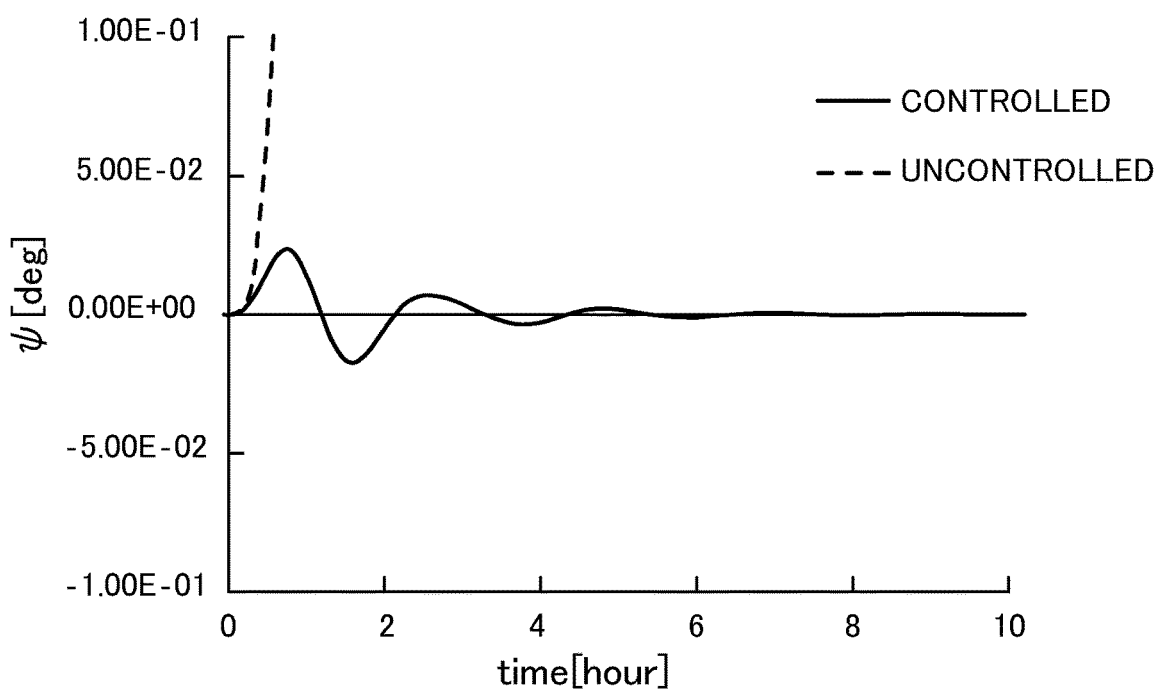
Figure 11A:
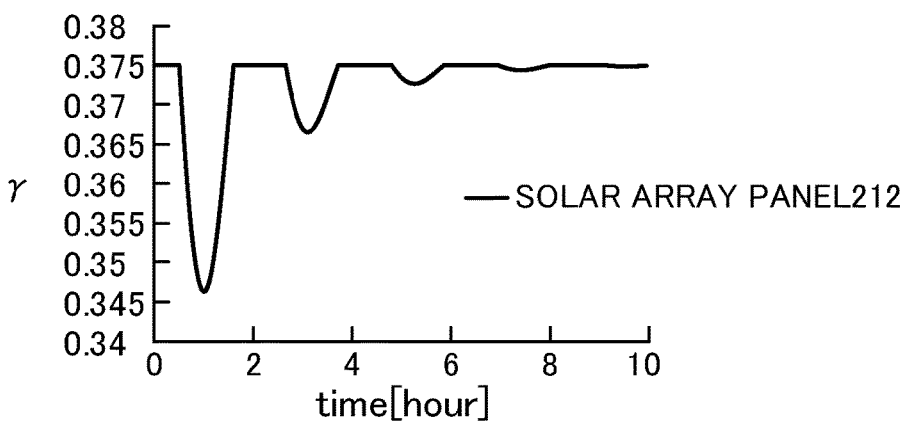
FIGS. 11(*a*) to 11(*d*) illustrate results of simulation of the attitude control system for a satellite according to the first embodiment of the present invention.
Figure 11B:
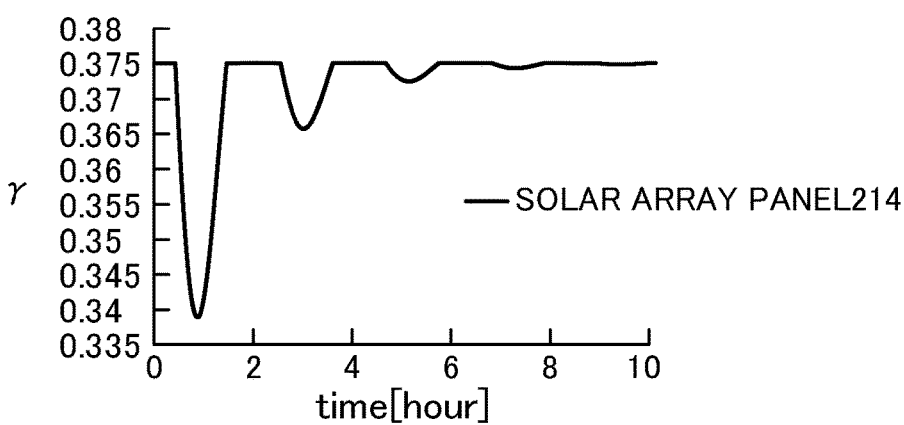
Figure 11C:
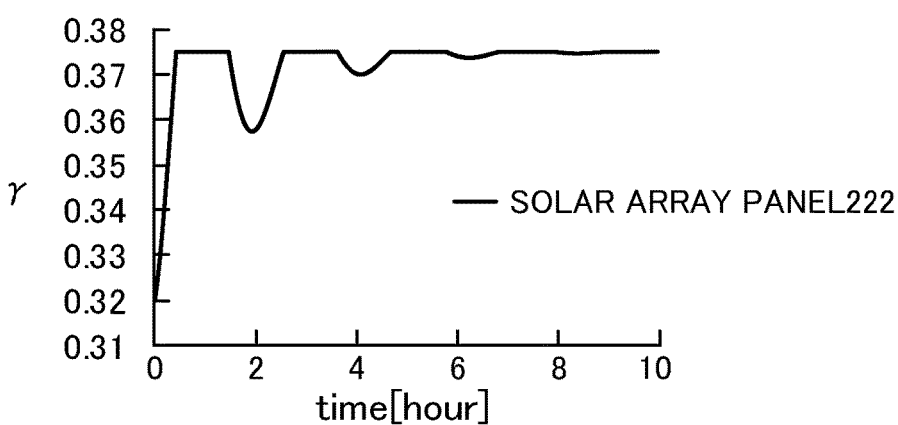
Figure 11D:
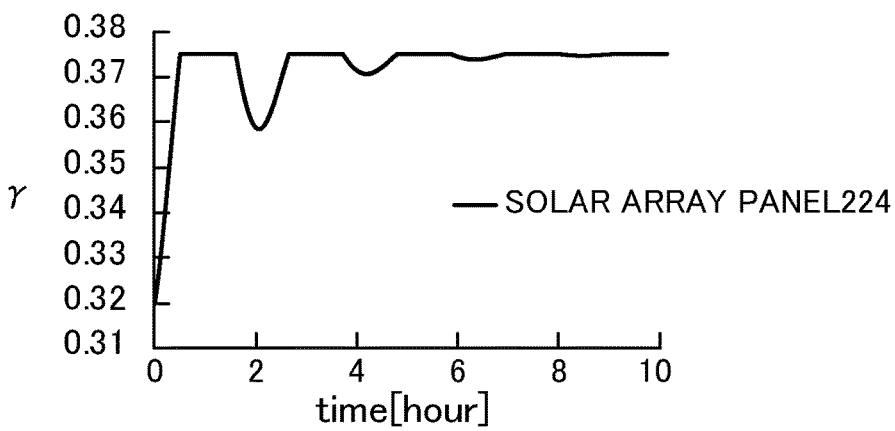

FIGS. 9(a), 9(b) and 10 illustrate the result of performing PD control by the attitude controller 35. FIGS. 9(a) and 9(b) illustrate comparison between temporal changes in uncontrolled and controlled $\varphi$ and $\psi$. FIG. 10 illustrates temporal changes in $\varphi$ and $\psi$. FIGS. 11(a) to 11(d) illustrate changes in $\gamma$ in each of the solar cell arrays 212, 214, 222, and 224 (when the absorption ratio $C_{abs}$ of solar cells is 0.8, $\gamma$ corresponds to 0 to 0.375 with the electricity generation ratio being in the range of 0 to 30% according to Expression (3)). Here, proportional gain Kp$\varphi$ and derivative gain Kd$\varphi$ of the angle $\varphi$ are set to Kp$\varphi$=0.01 and Kd$\varphi$=5.0, respectively. Proportional gain Kp$\psi$ and derivative gain Kd$\psi$ of the angle $\psi$ are set to Kp$\psi$=0.01 and Kd$\psi$=3.0, respectively.

It takes about 6 to 7 minutes for each of the solar cell arrays 212, 214, 222, and 224 to reach an equilibrium temperature from the time of switchover from the maximum output state to the shunt state. Since the time is sufficiently small as compared with a time constant for the attitude change, the time taken for temperature change in each of the solar cell arrays 212, 214, 222, and 224 is negligible.

FIGS. 9(a), 9(b) and 10 indicate that the attitude control of the present embodiment suppresses the oscillation of the satellite 1 fairly well. FIG. 10 also indicates that an angle change rate of the aforementioned magnetic wheel, which is 360 arcsec/1 hour, is suppressed to about 1 arcsec/1 hour in attitude control of the present embodiment. This indicates that very high-precision attitude control is accomplished.

In the above embodiment, the solar array panels having configuration 2 in which aluminum is vapor-deposited on the surface opposite to the light receiving surface are used. However, it is also possible to use the solar array panels having configuration 1 that are conventional solar array panels in which the light receiving surface and the surface opposite to the light receiving surface have the same thermal emissivity. In this case, maximum values of the thermal radiation torque when the solar array panels having the same shape as that in the above embodiment are used are 7.70× $10^{-6}$ N·m around the $k_B$ axis and 1.93×$10^{-6}$ N·m around the $k_B$ axis in the center of the earth direction, which are small to resist the gravity gradient torque illustrated in Table 3. However, the thermal radiation torque is proportional to the area and the arm length of the light receiving surface of solar array panel, and therefore if the area of the light receiving surface of the solar array panel is enlarged such that at least the arm length is increased, the thermal radiation torque is increased at least in proportion to the square of the arm length. As a result, it becomes possible to resist the gravity gradient torque. For example, in the case of using solar array panels with a shorter side of 5 m and a longer side of 15 m, thermal radiation torque of 4.0×10-5 N·m can be obtained, which is enough to resist the gravity gradient torque.

In the above embodiment, the unit of the control of the electricity generation ratio is the solar cell array, which is one example of the solar array panel divisions, having a shape which is formed by dividing the solar array panel into two, and the control is executed by continuously changing the electricity generation ratio for each of the entire solar cell arrays. As an alternative to a part or the whole of the above configuration, the electricity generation ratios of the solar array panels or the solar array panel divisions may be controlled by executing control for switching the maximum output state and the shunt state for each of a plurality of solar cell groups each of which has a region smaller than the solar array panels or the solar array panel divisions that are the units of the control of the electricity generation ratio, and controlling the areas and the positions of the solar cell groups in the maximum output state and the solar cell groups in the shunt state. In this case, if the solar cell groups in the shunt state are arranged on the side far from the satellite body, it becomes possible to generate, with the same electricity generation ratio, larger torque than that in the case where control is executed to continuously change the electricity generation ratio of each of the entire solar array panels or the solar array panel divisions. This means that the same torque can be generated at a smaller electricity generation ratio, so that a required margin of electricity can be reduced.

The electricity generation ratios of the solar cell or cells may also be controlled per region by attaching a film with a variable transmittance to each region on the light receiving surface of the solar array panel and controlling the transmittance of each region.

In each of the embodiments, decreasing the area of each of the solar array panel divisions and/or the area of each of the solar cell groups enables more detailed and complicated control to be executed. One of such examples is to arrange solar array panel divisions and/or solar cell groups, which are each identical in shape and small in area, in a matrix form. It goes without saying that the shapes and areas of the solar array panel divisions and/or the solar cell groups may be different from each other.

In the above embodiment, the satellite body 10 has a cubic shape with one side being 2 m. However, since the thermal radiation torque can be changed by appropriately selecting the shape and area of the light receiving surface of the solar array panel as described before, the satellite 1 can be made to have any appropriate shape and size. As the configuration of the solar array panel, any appropriate configuration, such as the configuration 1, may be adopted.

Thus, according to the present embodiment, it becomes possible to control the attitude of an aircraft with high precision and without causing turbulence, the attitude being controlled by using the solar array panels mounted on the spacecraft without the necessity of mounting an additional device thereon.

Second Embodiment

FIG. 12 illustrates external appearance and arrangement of a first satellite 41 as a first spacecraft and a second satellite 42 as a second spacecraft according to a second embodiment of the present invention. The first satellite 41 and the second satellite 42 are solar-sailing ultra-small satellites, which include satellite bodies 410 and 420 and solar array panels 411 and 421, respectively. The satellite bodies 410 and 420 each have a cubic shape with one side being 0.1 m. The solar array panels 411 and 421 have square light receiving surfaces 4110 and 4210 with one side being 0.75 m, respectively. The satellite bodies 410 and 420 are arranged in the center of surfaces opposite to the light receiving surfaces of the solar array panels 411 and 421, respectively.

Figure 13:
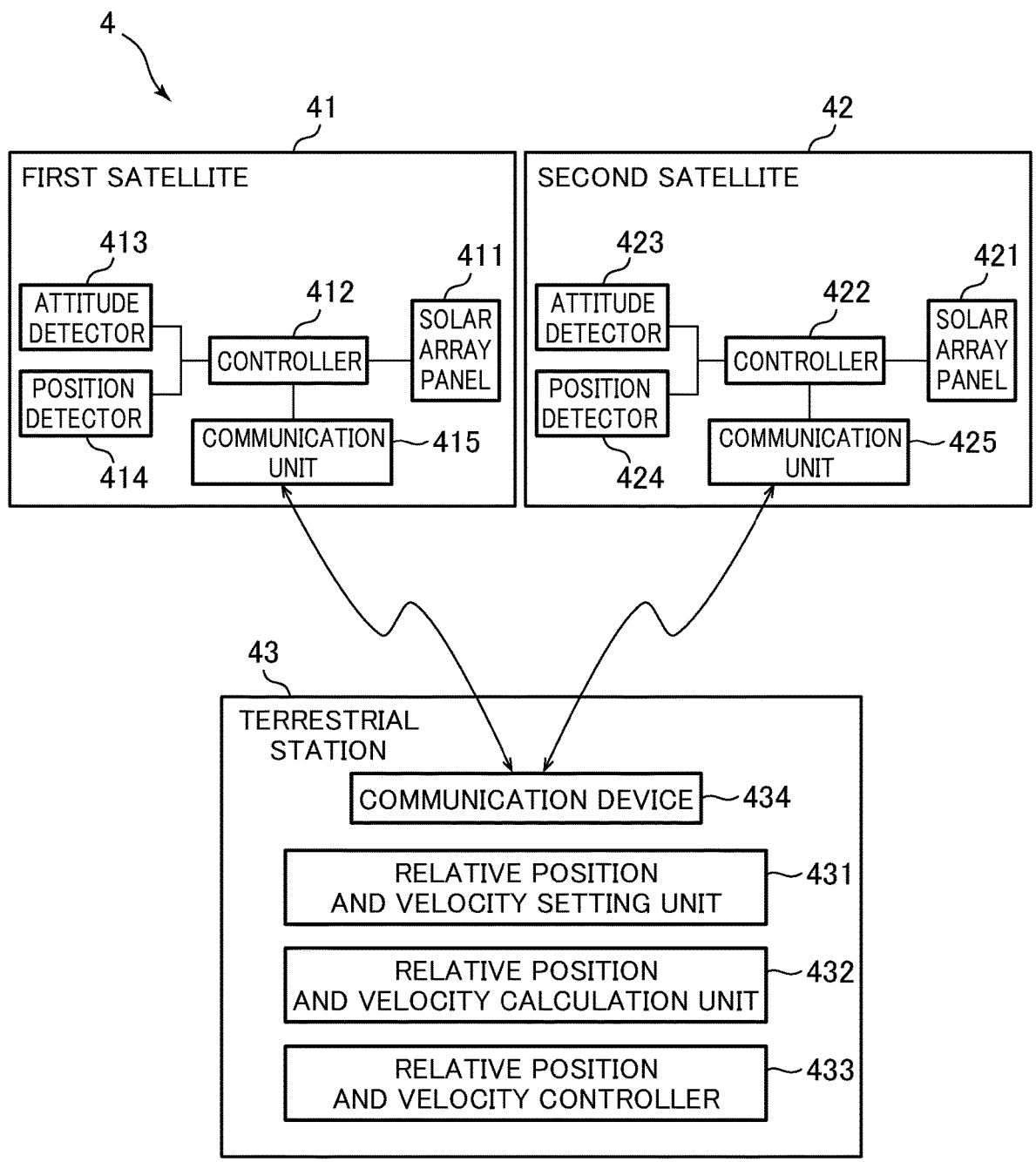
FIG. 13 illustrates the entire configuration of a system for controlling a relative position and velocity of the first satellite and the second satellite according to the second embodiment of the present invention.

FIG. 13 illustrates the entire configuration of a system 4 for controlling a relative position and/or relative velocity of the satellite 41 as a first spacecraft and the satellite 42 as a second spacecraft according to the second embodiment of the present invention.

The first satellite 41 has the solar array panel 411, a controller 412, an attitude detector 413, a position detector 414, and a communication unit 415. Similarly, the second satellite 42 has the solar array panel 421, a controller 422, an attitude detector 423, a position detector 424, and a communication unit 425. The attitude detectors 413 and 423 include a star sensor and an earth sensor to detect attitude angles of the satellite bodies 410 and 420, respectively. The position detectors 414 and 424 include a GPS positioning device to detect the positions of the satellite 41 and the satellite 42 themselves. The attitude detected by the attitude detectors 413 and 423 may be an appropriate parameter other than the attitude angle.

A terrestrial station 43 includes a relative position and velocity setting unit 431, a relative position and velocity calculation unit 432, a relative position and velocity controller 433, and a communication device 434. The relative position and velocity calculation unit 432 and the relative position and velocity controller 433 may be provided in the first satellite 41, the second satellite 42, and/or other spacecraft which are not illustrated.

The communication units 415 and 425 of the first satellite 41 and the second satellite 42 and the communication device 434 of the terrestrial station 43 each have an antenna which is not illustrated, and mutually exchange information through the antennas. The terrestrial station 43 transmits control information to the communication units 415 and 425. The communication units 415 and 425 transmit information, such as attitude angles detected by the attitude detectors 413 and 423 and positions of the satellite 41 and the satellite 42 themselves detected by the position detectors 414 and 424, to the terrestrial station 43, respectively.

At the relative position and velocity setting unit 431, a target relative position and a target relative velocity of the second satellite 42 relative to the first satellite 41 can be set.

The relative position and velocity calculation unit 432 calculates the relative position and velocity of the second satellite 42 relative to the first satellite based on the information on the attitude angles and the positions received from the first satellite 41 and the second satellite 42.

Based on the relative position and/or the relative velocity calculated by the relative position and velocity calculation unit 432 and on the target relative position and/or the target relative velocity set by the relative position and velocity setting unit 431, the relative position and velocity controller 433 generates control information for controlling the electricity generation ratio of each of the solar array panels 411 and 421 of the first satellite 41 and the second satellite 42 so as to cause each of the first satellite 41 and the second satellite 42 to generate thrust whereby the relative position and/or relative velocity become the target relative position and/or target relative velocity through execution of control such as feedback control and feedforward control. The relative position and velocity controller 433 then transmits the generated control information to the first satellite 41 and the second satellite 42 through the communication device 434.

The controllers 412 and 422 of the first satellite 41 and the second satellite 42 set the electricity generation ratios of the solar array panels 411 and 421 based on the control signals sent from the relative position and velocity controller 433 and received by the communication units 415 and 425, respectively. As a consequence, the thrust based on the thermal radiation pressure generated from the solar array panels 411 and 421 is controlled.

Generally, the attitudes of the first satellite 41 and the second satellite 42 are controlled by the controllers 412 and 422 so that the solar array panels 411 and 421 point to the sun. However, the control of the attitudes of the first satellite 41 and the second satellite 42 is not limited thereto.

Consider, for example, the case of bringing the second satellite 42, which is at a position 2 km away from the first satellite 41, closer to a position 1 km away from the first satellite 41. For simplification, the solar array panel 411 of the first satellite 41 is controlled to be in a maximum output state to generate a minimum thermal radiation pressure while the solar array panels 421 of the second satellite 42 is controlled to be in a shunt state to generate a maximum thermal radiation pressure. When the solar cells having the aforementioned configuration 2 are used as the solar array panels 411 and 421, a difference in thermal radiation pressure up to $f_{TRP}=7.05\times10^{-7}$ N/m$^2$ is generated between the first satellite 41 and the second satellite 42. Since the area of the solar array panels 411 and 421 is 0.75 m×0.75 m=0.56 m$^2$, a difference in thrust of $7.05\times10^{-7}$ N/m$^2$×0.56 m$^2$=3.9×10$^{-7}$ N is generated between the first satellite 41 and the second satellite 42. Since the mass of the second satellite 42 is 1 kg, the second satellite 42 approaches the first satellite 41 with a relative acceleration of $3.9\times10^{7}$ m/s$^2$. Consequently, the second satellite 42 can approach the position that is 1 km away from the first satellite 41 in about a half day.

In the above embodiment, the satellite bodies 410 and 420 of the first satellite 41 and the second satellite 42 have a cubic shape with one side being 0.1 m. However, since the thermal radiation torque can be changed by appropriately selecting the shape and area of the light receiving surface of the solar array panel as described before, the first satellite 41 and the second satellite 42 can be made to have any appropriate shape and size. As the configuration of the solar array panel, any appropriate configuration, such as the configuration 1, may be adopted.

Thus, according to the present embodiment, it becomes possible to control the relative position and velocity of an aircraft with high precision and without causing turbulence, the relative position and velocity being controlled by using the solar array panels mounted on the spacecraft without the necessity of mounting an additional device thereon.

Although the present invention has been described by using some embodiments as examples, the present invention is not limited thereto. It is apparent to those skilled in the art that various arrangements and modifications may be adopted for the aspects and details of the present invention without departing from the spirit and scope thereof.

REFERENCE SIGNS LIST

1 Satellite
10 Satellite body
21, 22 Solar array panel
210, 220 Light receiving surface
212, 214, 222, 224 Solar cell array
212c, 214c, 222c, 224c Center of pressure
3 Attitude control system
31 Attitude detector
33 Position detector
34 Target attitude setting unit
35 Attitude controller
36 Torque generator
361 Thruster
362 Wheel
4 Relative position and velocity control system
41 First satellite
410 Satellite body
411 Solar array panel
4110 Light receiving surface
412 Controller
413 Attitude detector
414 Position detector
415 Communication unit
42 Second satellite
420 Satellite body
421 Solar array panel
4210 Light receiving surface
422 Controller
423 Attitude detector
424 Position detector
425 Communication unit
43 Terrestrial station
431 Relative position and velocity setting unit
432 Relative position and velocity calculation unit
433 Relative position and velocity controller
434 Communication device

What is claimed is:

1. A system for controlling a relative position and/or a relative velocity of a first spacecraft and a second spacecraft, comprising:
   the first spacecraft and the second spacecraft each including a solar array panel;
   a relative position and velocity controller configured to control an electricity generation ratio of each of the solar array panels of the first spacecraft and the second spacecraft to cause each of the first spacecraft and the second spacecraft to generate thrust that changes the relative position and/or velocity of the first spacecraft and the second spacecraft; and
   a relative position and velocity setting unit configured to set a target relative position and/or a target relative velocity of the second spacecraft relative to the first spacecraft, wherein
   the relative position and velocity controller controls the electricity generation ratio of each of the solar array panels of the first spacecraft and the second spacecraft to cause each of the first spacecraft and the second spacecraft to generate thrust that provides the target relative position and/or target relative velocity set by the relative position and velocity setting unit.

2. The system according to claim 1, wherein
   the first spacecraft and the second spacecraft each includes a position detector configured to detect a position of its own spacecraft and to output position information,
   the system further includes a relative position and velocity calculation unit configured to calculate the relative position and/or relative velocity of the second spacecraft relative to the first spacecraft based on the position information from the position detectors of the first spacecraft and the second spacecraft, and the relative position and velocity controller controls the electricity generation ratio of each of the solar array panels of the first spacecraft and the second spacecraft based on the relative position and/or relative velocity of the second spacecraft relative to the first spacecraft calculated by the position and velocity calculation unit.

3. The system according to claim 1, wherein
the relative position and velocity controller puts the solar array panel of the second spacecraft in a shunt state.

4. The system according to claim 1, wherein
the relative position and velocity controller puts the solar array panel of the first spacecraft in a maximum output state.

5. The system according to claim 1, wherein
each of the solar array panels has a light receiving surface significantly higher in temperature than a surface opposite to the light receiving surface of each of the solar array panels during operation.

6. The system according to claim 1, wherein
the surface opposite to the light receiving surface is smaller in thermal emissivity than the light receiving surface.

7. The system according to claim 6, wherein
the surface opposite to the light receiving surface of each of the solar array panels is coated with aluminum.

8. The system according to claim 1, wherein
an attitude of the first spacecraft and/or the second spacecraft is controlled to cause the solar array panels of the first spacecraft and/or the solar array panels of the second spacecraft to point to the sun.

* * * * *